Oct. 21, 1947.	H. R. DAVIS	2,429,402
HANDLING OF GRANULAR MATERIAL
Filed June 5, 1943	2 Sheets-Sheet 1

INVENTOR
*Hyman R. Davis*
BY
*Rolf E. Schneider*
AGENT

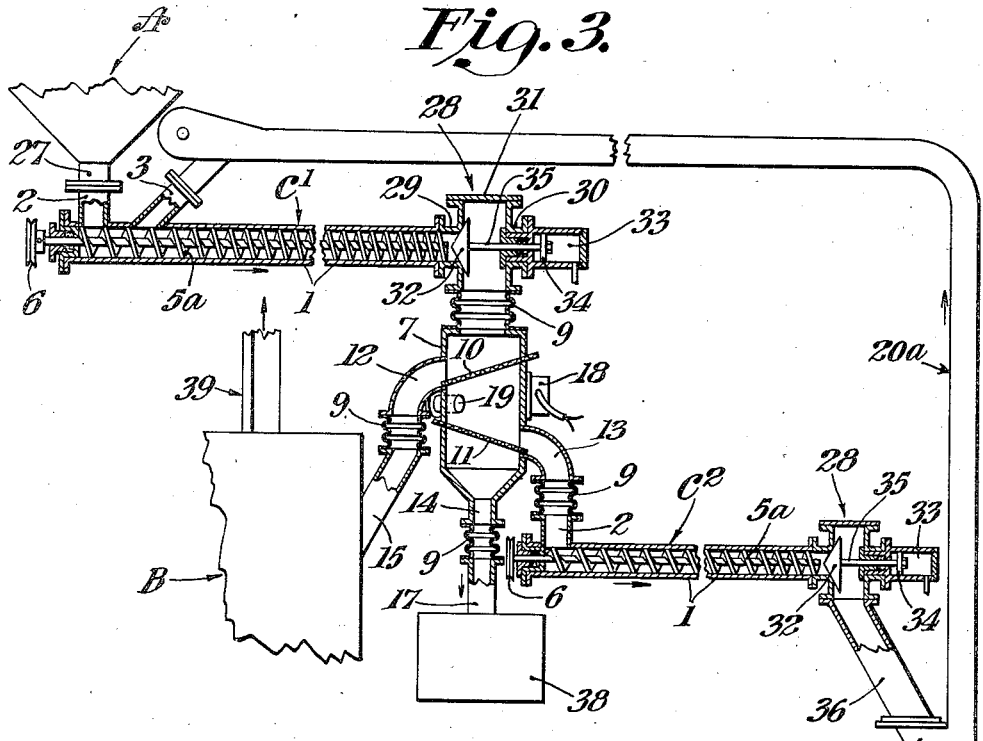

Patented Oct. 21, 1947

2,429,402

UNITED STATES PATENT OFFICE 2,429,402

HANDLING OF GRANULAR MATERIAL

Hyman R. Davis, New York, N. Y., assignor to The Lummus Company, New York, N. Y., a corporation of Delaware Application June 5, 1943, Serial No. 489,764

10 Claims. (Cl. 23—1)

The present invention relates to the handling or conveyance of a relatively fragile granular material in an improved manner to protect it from breakage and attrition and also to the utilization of such material to form a fluid-tight seal thereof as it is passed between regions in which the maintenance of different fluid pressures is required. More particularly, the invention relates to the protection of a relatively fragile granular catalyst in the handling or conveyance thereof in a catalytic reaction system and to the utilization of the catalyst to form a gas-tight seal thereof as it is passed continuously between a reaction zone and another zone for the maintenance of a required pressure differential between such zones.

An important object of the invention is to provide a novel system for the protection of a relatively fragile granular material during the handling thereof by the employment of a suitable filler material in conjunction therewith. According to the invention, prior to a required handling or conveyance of the granular material, a more finely divided material is added thereto, and the two materials are then subjected to a mixing operation performed in such a manner as to distribute the more finely divided material throughout the granular material so that the granules of the latter are shielded and cushioned by the finer material from breakage and abrasion.

Another object of the invention is to provide a system for continuous reuse of the finely divided material in continuous remixture with an advancing stream of granular catalyst or other granular material.

Another object of the invention is to provide, along with the system for reuse of the finely divided material, a system for continuous separation therefrom of those portions which have been worn too fine for further service.

Another object of the invention is to provide an arrangement for the employment of a finely divided material with a granular catalyst in a catalytic reaction system wherein the catalyst is continuously passed from a reaction zone to a catalyst reactivation zone and from the latter zone back to the reaction zone. The invention provides for the protection of the catalyst in both of such passages thereof between the zones and at the same time provides for utilization of the mixture of the granular catalyst and the more finely divided material to effectually seal the zones from each other for maintenance of a required pressure differential therebetween or for prevention of the leakage of the gaseous contents from one zone to the other.

Other objects and advantages of the invention will appear hereinafter.

Figure 2:
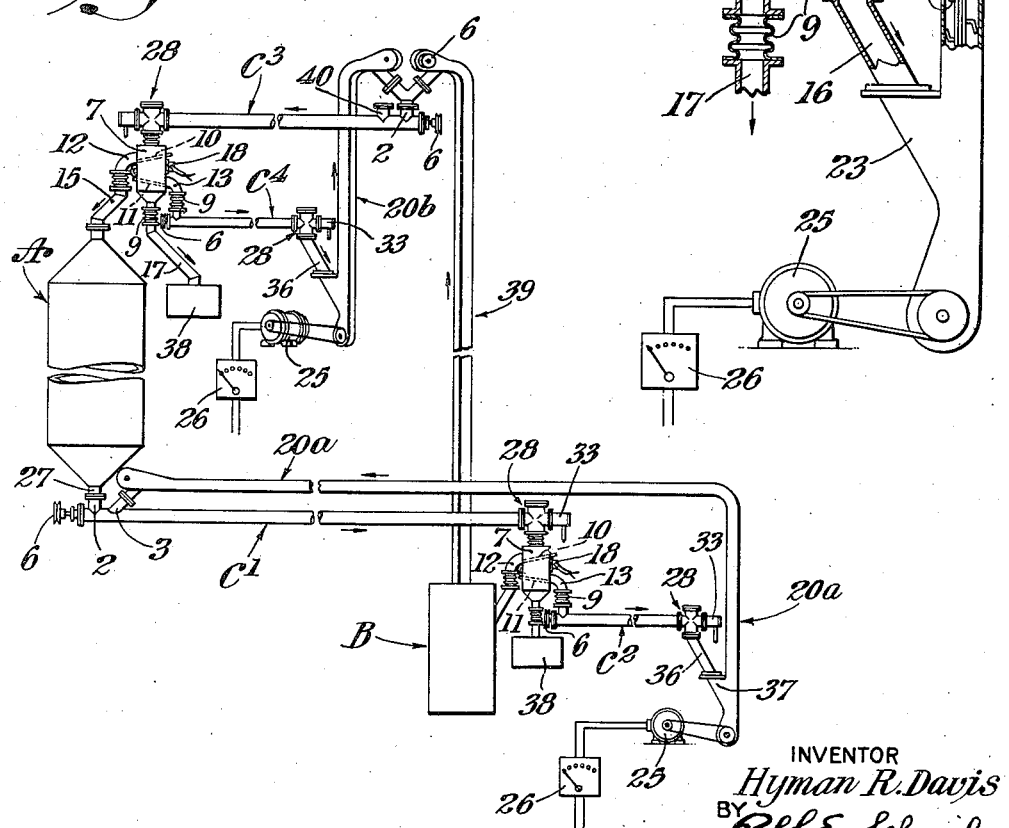
Fig. 2 is a diagrammatic view of a continuous catalytic reaction system equipped with apparatus for effecting the aforesaid protection of the catalyst in the passage thereof from a reaction zone to a reactivation zone and from the latter zone back to the reaction zone and for the forming of the mixed granular and finely divided materials into seals between said zones.

Fig. 3 is an enlarged detail sectional view of the means indicated in Fig. 2 for handling the catalyst and the finely divided material in the passage of the catalyst from the reaction zone to the reactivation zone with parts of such means in elevation; and Fig. 4 is a view, similar to Fig. 3, of a portion of the means for handling the catalyst and the finely divided material in the passage of the catalyst from the reactivation zone to the reaction zone.

This application is a continuation-in-part of my copending application, Serial No. 445,157, filed May 30, 1942, and entitled "Catalytic reactor." The said copending application has matured into Patent No. 2,321,015, issued June 8, 1943.

Certain types of catalysts and especially catalysts employed in certain hydrocarbon conversion processes are prepared in rather large-mesh, granular form. The granules, for example, may be in the shape of pellets, spheres, or beads of a substantially uniform predetermined size; or they may be of irregular size and shape. Often the catalyst is a relatively fragile material; and, in the handling thereof in a continuous conversion system, the catalyst granules are subject to breakage and abrasion which objectionably reduce their size and also form powder or "fines" of the material. These fines tend to be carried out of the reaction chamber by the gaseous or vaporous reaction products with consequent gradual loss of the catalyst and with the necessity of separating the fines from the reaction products.

In some catalytic reaction systems, the catalyst is passed by means of rather long conveyor lines to and from a reaction zone and a reactivation zone. In the course of such passage, the catalyst granules are subjected to wear and breakage by impact and friction with the conveyor surfaces and also by mutual impact with and friction between the granules themselves. Thereby, much of the catalyst is lost or rendered unfit for service.

The present invention is directed to the prevention of such damage and loss of catalyst by provision for preparing and conveying the catalyst in a manner to protect it from breakage and attrition. The invention is also directed to the utilization of the catalyst so prepared to form seals for the retention of desired fluid pressure conditions in one or more zones through which the catalyst is continuously passed in succession in a catalytic reaction system.

Figure 1:
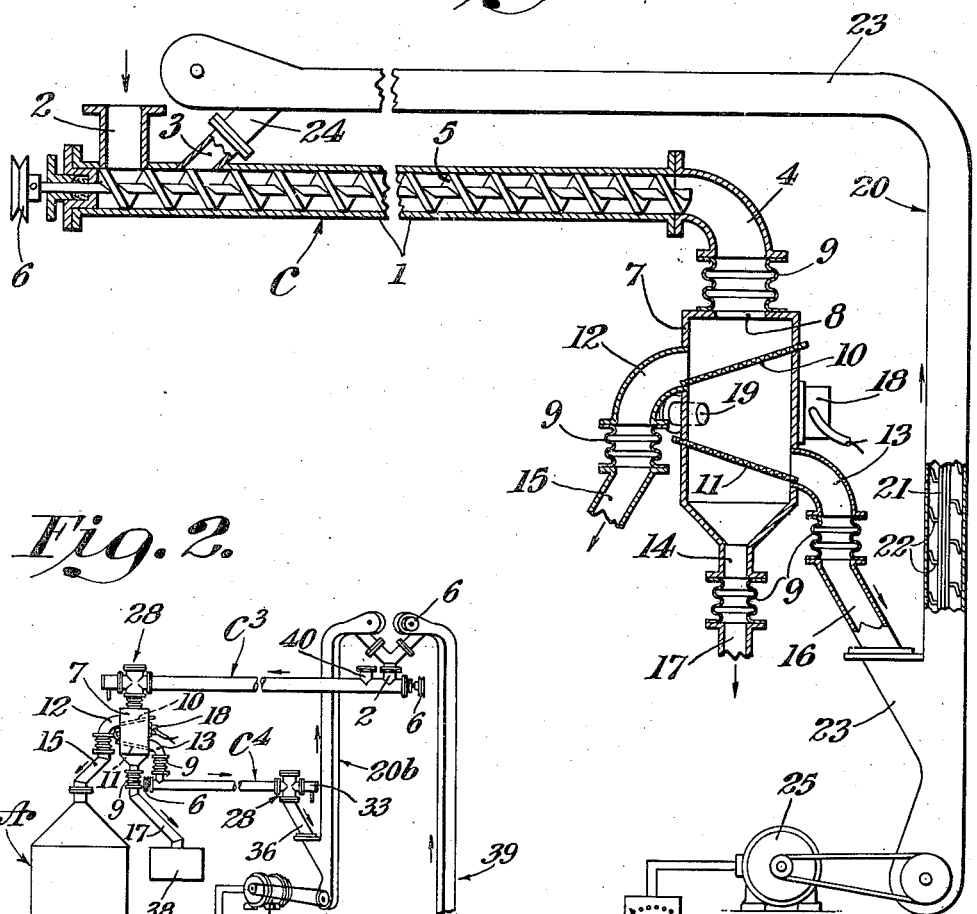
Fig. 1 is a vertical longitudinal sectional view of a screw conveyor equipped with means for feeding finely divided material thereto for mixture with granular material propelled by the conveyor and with means for separating said materials and recycling the finely divided material.

In Fig. 1 of the drawings, there is illustrated, in association with a screw conveyor C, apparatus for carrying out my improved and novel method of protecting a granular catalyst or other relatively fragile granular material from breakage and attrition as the material is transported by the conveyor. The conveyor comprises a horizontally disposed tube or barrel 1 defining a conveyor conduit. This tube is closed at one end and has, adjacent such end, a pair of upwardly extending inlet nozzles 2 and 3. At its opposite end the tube has an elbow forming a downwardly extending discharge nozzle 4. A conveyor screw 5 is rotatably mounted within the tube and has its shaft journalled in a bearing in the closed end of the tube. One end of the shaft projects outwardly from the closed end of the tube and has affixed thereto a pulley 6, through which power to drive the screw may be supplied from a suitable source (not shown).

A casing 7 is disposed beneath the discharge nozzle 4 of the conveyor and has at its upper end an opening 8 in sealed connection with nozzle 4 through a flexible union 9 of the bellows expansion joint type. A pair of screens 10 and 11 are borne by the casing and are arranged in vertically spaced and oppositely inclined relation to each other. The lower screen 11 is of finer mesh than the upper screen 10. The casing has three discharge nozzles including a pair of lateral nozzles 12 and 13 leading outwardly and downwardly from the lower edges of the screens 10 and 11, respectively, and a downwardly extending nozzle 14 at the lower end of the casing. Nozzle 12 is connected through a flexible union to a receiving nozzle or chute 15; nozzle 13 is connected through a flexible union to a receiving nozzle 16; and nozzle 14 is connected through a flexible union to a receiving tube or chute 17. These flexible unions are similar to the first-mentioned union 9 at the upper end of the casing, and they are designated by the same reference character. An electric vibrator 18 is mounted upon the casing, and the flexible unions enable the casing and its screens to be shaken by the vibrator. Between the screens, the casing has a charging nozzle 19. As an alternative to vibration of the casing 7, provision may be made for vibration of the screens independently of the casing.

The nozzle 16, which is in receiving connection with the casing nozzle 13, is, in turn, in delivery connection with a conveyor line 20 leading upwardly and laterally to the inlet nozzle 3 of the screw conveyor. The conveyor line 20 may be of any suitable type; in the present instance it comprises an endless belt 21 trained over pulleys at the ends of the line and provided with buckets or flights 22. A casing 23 encloses the belt and pulleys and bears the inlet nozzle 16 and also a discharge nozzle 24 in sealed delivery connection with the inlet nozzle 3 of the screw conveyor. An electric motor 25 is in driving connection with one of the pulleys of the conveyor line 20, and a rheostat device 26 is provided for varying the speed of the motor. Of course, other suitable means may be employed instead of the rheostat to vary the speed of the conveyor belt 21.

In the operation of the apparatus just described, the conveyor screw 5 and the conveyor belt 21 are continuously driven, the finely divided material is charged into the casing 7 through the nozzle 19, and the granular material is continuously charged into the conveyor tube 1 through the nozzle 2. The finely divided material passes from the casing 7 through the nozzles 13 and 16 to the conveyor line 20 and is continuously delivered by the belt 21 to the conveyor tube 1 through the nozzle 3. Within the tube 1 the granular material and the more finely divided material are thoroughly mixed by the screw 5 to distribute the latter material throughout the granular material. The mixture of materials is continuously passed along the tube to the discharge nozzle 4; and, in such passage, the individual granules of the granular material are protected from breakage and abrasion by the shielding and cushioning effect of the finely divided material distributed between and around the granules. The mixture discharged through the nozzle is delivered to the screen 10 within the casing 7, and vibration of the casing and the screen by the device 18 causes separation of the materials. The finely divided material passes through the screen 10, and the granular material passes out of the casing through the nozzle 12 for delivery to any desired point. The finely divided material so separated from the granular material is continuously passed through the nozzles 13 and 16 and into the conveyor line 20 for recycling to the nozzle 3 and reemployment for admixture with the stream of granular material continuously advancing within the tube 1. Any of the more finely divided material which becomes worn or crushed too fine for proper service is continuously separated from the body of the material by the fine-mesh screen 11 and is discharged from the apparatus through the nozzle 14. The charge of finely divided material may be replenished by delivery of fresh material through the nozzle 19. Such recharging may be performed either periodically or continuously.

Figs. 2, 3 and 4 illustrate employment of the method just described for protecting a granular catalyst in continuous passage thereof from a reaction zone to a reactivation zone and thence back to the reaction zone. These drawings also illustrate provision for forming the mixture of catalyst and finer material into seals at both the catalyst entrance to and the catalyst exit from the reaction zone and the reactivation zone to maintain a desired pressure or vacuum condition in each zone according to the requirements for a given reaction.

Many of the parts of the apparatus shown in Figs. 2, 3, and 4 are similar to parts shown in Fig. 1, and similar parts are correspondingly numbered. With respect to Fig. 2, a reaction zone represented by a catalyst chamber A has conveyor connections with a catalyst reactivation zone, diagrammatically indicated at B, for continuous passage of the catalyst from the reaction zone to the reactivation zone and thence back to the reaction zone for reuse of the reactivated catalyst. The conveyor connection between the catalyst exit from the reaction zone and the catalyst entrance to the reactivation zone will be first described.

A screw conveyor $C^1$, similar to that previously described, has its inlet nozzle 2 in sealed receiving connection with a catalyst discharge nozzle 27 at the lower end of the reaction chamber A. At the opposite end of the tube or conduit of the conveyor there is a vertically arranged cylindrical casing 28 having oppositely projecting flanged nozzles 29 and 30 and a head 31 closing its upper end. The nozzle 29 is in gas-tight connection with the adjacent end of the tube 1 and forms the outlet for the tube. Within the tube there is a conveyor screw 5a extending throughout the length of the tube and preferably having a pitch diminishing gradually toward the outlet of the tube. The shaft of the screw projects outwardly through a stuffing box at the inlet end of the tube and has a driving pulley 6 affixed to it. At the outlet of the conduit there is an outwardly opening conical valve or choke element 32 normally seated upon a beveled seat within the outlet. Fluid pressure means are provided to maintain this valve in closed position and include an air cylinder 33 secured to the nozzle 30 and having a piston 34 with a stem 35 extending through a stuffing box and affixed to the choke element 32. Compressed air within the cylinder acts upon the piston to urge the choke element constantly toward the closed position.

Casing 28 opens at its lower end through an expansion joint into a casing 7 similar to the one previously described and having similar screens 10 and 11. Nozzle 13 of this casing opens through an expansion joint into the nozzle 2 of the tube 1 of a screw conveyor $C^2$ similar to the one just described and having a screw 5a with a pitch diminishing gradually toward the outlet end of the tube. A casing 28 similar to that of conveyor $C^1$ is secured to this outlet end of the tube $C^2$ and is similarly provided with a choke element and an air cylinder and piston for urging such choke element to the closed position. A nozzle 36 leads from the casing 28 and is in sealed delivery connection with a nozzle 37 on a recycling conveyor 20a similar to the conveyor 20 previously described. The conveyor 20a is in sealed delivery connection with the nozzle 3 of the associated screw conveyor $C^1$. Nozzle 12 of casing 7 opens through an expansion joint into the catalyst inlet to the reactivation zone B, and nozzle 14 opens through an expansion joint into a closed container 38.

From the catalyst outlet of the reactivation zone a conveyor 39 of any suitable type such as the belt-and-bucket type, for example, leads to the inlet nozzle of a screw conveyor $C^3$ similar to that which leads from the reaction chamber and similarly provided with a screw 5a having a pitch diminishing gradually toward the outlet end of its tube or conduit. A casing, a choke element, an air cylinder, and a piston, all similar to those previously described, are all similarly associated with the outlet end of this conveyor. The lower end of the casing 28 of this conveyor opens through an expansion joint into a casing 7 similar to those previously described and similarly provided with screens 10 and 11. The nozzle 13 of the casing 7 opens through an expansion joint into a conveyor $C^4$ similar to the conveyor $C^2$ and similarly provided with a casing 28 and associated choke element and an air cylinder and piston for urging the choke element toward the closed position. The nozzle 36 of casing 28 of this conveyor is in sealed delivery connection with a recycling conveyor 20b, which leads to the inlet nozzle 2 of the conveyor $C^3$ and is in sealed delivery connection therewith. Nozzle 12 of casing 7 opens through an expansion joint into the catalyst inlet nozzle of the reactor A. Nozzle 14 discharges through an expansion joint into a closed container 38.

Each of the recycling conveyors 20a and 20b has a motor 25 for driving it; and each motor is provided, in the present instance, with a rheostat device 26 for varying its speed. Other suitable means may, however, be employed for varying the speed of the conveyors. Each of the conveyors $C^1$, $C^2$, $C^3$, and $C^4$ and also the conveyor 39 has a pulley 6 for driving it from a suitable power source (not shown). Preferably, for operating control, the recycling conveyors are driven independently of the screw conveyors and the conveyor 39, and the speed of the recycling conveyors is variable independently of the other conveyors. Each of the casings 7 containing the screens is provided with one of the electric vibrating devices 18 for shaking it.

In the operation of the system just described, the various conveyors are set into operation, and the finely divided protecting material is then introduced into the two casings 7 through the respective nozzles 19 thereof. The granular catalyst is introduced into the system until the latter is adequately charged for a continuous catalytic reaction process. This catalyst may be introduced at any suitable point in the system; for example, the conveyor $C^3$ is shown as provided with a nozzle 40 for such purpose. After the required amount of catalyst has been introduced, the nozzle 40 is sealed gas-tight. The catalyst is continuously passed by the conveyor $C^3$ and continuously receives the finely divided material delivered by the recycling conveyor 20b. The conveyor screw 5a mixes the finely divided material with the granular catalyst for protection of the latter as hereinbefore described and forces the mixture past the choke element 32 of the conveyor $C^3$. The yielding pressure of the choke element causes compacting of the mixture by the screw so that the mixture is continuously formed into a seal in which the finely divided material renders the packed catalyst substantially impermeable to gas flow. After passing the choke element, the mixture is continuously discharged into the casing 7 associated with conveyor $C^3$. There the materials are continuously separated by the screen 10. The separated catalyst is continuously passed through the nozzle 12 to the reactor A, and the separated finer material is continuously passed through the nozzle 13 to the conveyor $C^4$ wherein it is compacted against the choke element to form a gas-tight seal and continuously forced past the choke element and into the recycling conveyor 20b for return by the latter to the conveyor $C^3$.

From the reactor A the contaminated or spent catalyst continuously passes through the nozzle 2 into the screw conveyor line $C^1$. There the finely divided material is continuously supplied to the catalyst by the recycling conveyor 20a. The catalyst and the material are continuously mixed for protection of the catalyst; and the mixture is continuously propelled along the conveyor line, compacted against the choke element at the discharge end of the line to form it into a gas-tight seal, and continuously forced past the choke element and discharged into the casing 7 associated with conveyor C¹. In this casing the catalyst and the fine material are continuously separated by the screen 10. The separated catalyst is continuously passed through the nozzle 12 into the reactivation zone B, and the separated fine material is continuously passed through the nozzle 13 into the recycling conveyor 20a. The latter returns the material and delivers it through the nozzle 3 of conveyor C¹ for remixture with the advancing catalyst stream. The reactivated catalyst is continuously carried by the conveyor 39 from the reactivation zone B to the conveyor C³, thus completing the cycle.

Within the casings 7 associated with the conveyors C¹ and C³, the particles of the finely divided material which have become crushed or worn too fine for service are continuously separated from the body of material by the screen 11 and passed into the containers 38. These containers are closed gas-tight to prevent leakage of pressure into or out of the system. All of the connections between the various parts through which the catalyst and the finely divided material are passed are likewise made gas-tight for the same purpose. Material lost by discarding it into the containers 38 may be replenished by recharging the system with fresh material through the casing nozzles 19. Any suitable trap means or sealing means for retaining pressure may be employed for charging the material through such nozzles.

In certain instances, the conveyors C¹, C², C³, or C⁴ may be desirably arranged in a vertical position instead of horizontally as shown. In such case my invention is also applicable to the prevention of breakage and attrition of the granular catalyst. Where the operation is conducted at an elevated temperature, the several parts of the system will, of course, be suitably lagged.

It will be seen, therefore, that my invention provides for effectual protection of a granular catalyst from breakage and attrition in the handling thereof in a continuous catalytic reaction system and also provides for simultaneous utilization of the catalyst and the protecting material to effectually seal the reaction zone and the reactivation zone against leakage either of pressure or of gases through their catalyst inlets and their catalyst outlets.

While my invention has been described more particularly as employed in connection with a catalytic reaction process, it is susceptible of other satisfactory employment. The protective feature of the invention, for instance, may be employed satisfactorily for the protection of relatively fragile granular materials other than catalyst from breakage and abrasion in the handling thereof. Both the protective feature and the sealing feature may be employed also in a variety of contact processes other than those involving a catalytic chemical reaction. In particular, not only is my invention applicable to such hydrocarbon conversion reactions as catalytic cracking, polymerization, dehydrogenation, and the like; but it is also applicable to hydrocarbon treating actions such as clay treating and catalytic desulfurization. The type of catalyst or contact material selected will, of course, depend on the particular reaction or treatment desired.

My invention may also be employed in connection with the manufacture of catalyst pellets of natural or synthetic materials such as clay-like substances. These pellets, as they are formed, are extruded in a moist condition and must be dried before use. In addition, the substance of which they are made is often friable and easily subject to abrasion. Accordingly, the catalyst pellets may be admixed with a suitable powdered material, and the resulting mixture passed through a suitable drying mechanism such as a rotary kiln drier wherein the catalyst pellets are subjected to a considerable amount of sudden contact and impact with hard surfaces. The powdered material, however, serves to cushion these impacts and to substantially reduce the amount of abrasion caused thereby. A suitable powdered material may comprise fines of the catalytic material undergoing drying; or it may be any other suitable material, which may or may not also have a dessicant effect.

The filler material employed may be the same as the catalyst or other granular material, or it may be a different material suitable for the purposes of the invention. This filler material, of course, is finely divided as compared to the granular form of the other material. A suitable filler material softer than the granular material may be employed advantageously to protect the granular material from breakage and abrasion. In certain cases, where the filler material is sufficiently finely divided, the hardness thereof as compared to the granular material may not be particularly important since the cushioning effect will be provided anyway. It is generally desirable, however, that the filler material be no harder than the granular material in order to prevent objectionable abrasion of the latter by the filler material. Fines of the particular granular material being handled may serve as the powdered filler material; or talc or a similar substance in finely divided form and softer than the granular material being handled may be used as the filler material, for example.

It is also possible that the granular catalyst referred to herein may be a carrier impregnated with a catalytic substance instead of actually a catalyst itself. Therefore, the term "catalyst" wherever it occurs in the specification and claims comprehends a catalyst carrier as well as an actual catalyst.

My invention may be successfully employed under the following operating conditions given by way of example only: The catalyst comprises a suitable substance in the form of pellets or the like having an average diameter of ⅛ in., and the powdered filler material comprises an appropriate substance of approximately 100 to 200 mesh size. A pressure of 20 to 30 lbs./sq. in. is to be maintained in the reaction zone, and the reactivation zone is to be maintained at substantially atmospheric pressure.

While I have disclosed several satisfactory forms of embodiment of my invention, the invention is not to be limited to these specific embodiments and the details disclosed but is to include within its scope such changes as come within the spirit of the appended claims.

I claim:

1. In the handling of a mass of relatively fragile material in granular form by continuously passing said material along a path to a delivery point, the method of protecting said material from breakage and attrition in such passage, comprising continuously adding to said material a more finely divided solid material, continuously mixing said materials to distribute the more finely divided material throughout the granular material for protection of the granules of the latter from breakage and abrasion, continuously passing the mixture of said materials along said path without restriction of the flow of the granules of relatively fragile material, and continuously separating said materials at an advanced point in the travel of the mixture along said path.

2. The method as claimed in claim 1, wherein a granular catalyst is continuously moved from one point in a continuous catalytic reaction system to another.

3. In the handling of a catalyst in granular form by continuous passage thereof along a path to a delivery point, the method of protecting the catalyst from breakage and attrition in such passage, comprising continuously adding to the catalyst a more finely divided material, continuously mixing the catalyst and the finely divided material to distribute the latter throughout the catalyst for protection of the granules of the catalyst from breakage and abrasion, continuously advancing the mixture so formed along said path without restriction of the flow of the granules of catalyst, continuously separating the finely divided material from the catalyst at an advanced point in the travel of the mixture along said path, and continuously recycling the separated finely divided material and reemploying it in said mixing operation.

4. The method as claimed in claim 3, which includes withdrawing a portion of the finely divided material from the system and supplying thereto fresh finely divided material for said mixing and recycling.

5. In the handling of a catalyst in granular form by continuous passage thereof through a conduit to a delivery point, the method of protecting the catalyst from breakage and attrition in such passage, comprising continuously introducing the catalyst and a more finely divided material into one end of the conduit, continuously mixing the catalyst and the finely divided material within said conduit to distribute the latter throughout the catalyst for protection of the granules of the catalyst from breakage and abrasion, continuously advancing the mixture through said conduit without restriction of flow of the granules of the catalyst, continuously discharging the mixture from the other end of the conduit, continuously separating the finely divided material from the catalyst, and continuously recycling the separated finely divided material for introduction into the first end of the conduit.

6. In the handling of a relatively fragile catalyst in granular form by continuous passage thereof along a path to a delivery point, the method of protecting the catalyst from breakage and attrition in such passage, comprising continuously adding to the catalyst a more finely divided material of a hardness not exceeding that of the catalyst, continuously mixing the catalyst and the finely divided material to distribute the latter throughout the catalyst for protection of the granules of the catalyst from breakage and abrasion, continuously advancing the mixture so formed along said path, continuously separating the finely divided material from the catalyst at an advanced point in the travel of the mixture along said path, continuously separating from the separated finely divided material the portion thereof which has worn too fine, continuously recycling the remainder of the separated finely divided material and reemploying it in said mixing operation, and replenishing the finely divided material to compensate for that lost by said separation.

7. In a catalytic reaction process wherein a granular catalyst is continuously passed in succession through a reaction zone, through a reactivation zone, and back to the reaction zone, the method of protecting the catalyst from breakage and attrition in such passage, comprising continuously adding a more finely divided solid material to the catalyst as the latter is passed from the reaction zone to the reactivation zone and as it is passed from the reactivation zone to the reaction zone, continuously mixing said material with the catalyst in passage between the reaction zone and the reactivation zone and in passage from the latter zone to the reaction zone to distribute the material throughout the catalyst for protection of the granules thereof from breakage and abrasion, continuously passing the mixtures so formed toward the reactivation zone and the reaction zone respectively without restriction of the flow of the granules of catalyst, continuously separating said material from the catalyst before the latter reaches said zones, and continuously recycling the separated material and reemploying it in said mixing operations.

8. In a system for performing a contact process, a gas-tight conduit, an inlet at one end thereof for the introduction of granular contact material, a second inlet adjacent the first-named inlet for the introduction of a solid material more finely divided than the contact material, a screw conveyor in said conduit, an outlet at the other end of said conduit, choke means constructed and arranged to yieldably resist passage of the granular material through said outlet, a separating chamber, a delivery conduit connecting the outlet of said gas-tight conduit to said separating chamber, a pair of superimposed screens in said separating chamber, a delivery conduit extending from the separating chamber above and adjacent the upper screen to a contacting chamber, an outlet in the separating chamber above and adjacent the lower screen, and a second outlet in the separating chamber below the lower screen.

9. In a system for performing a contact process and including a contacting chamber and a chamber for treatment of contact material, apparatus for passing granular contact material between said chambers, comprising a gas-tight conduit, an inlet at one end thereof for the introduction of said granular material, a second inlet adjacent the first-named inlet for the introduction of a solid material more finely divided than the contact material, a screw conveyor in said conduit, an outlet in the other end of said conduit, choke means constructed and arranged to yieldably resist passage of the granular material through said outlet, a separating chamber, a delivery conduit connecting the outlet of said gas-tight conduit to said separating chamber, a screen in said separating chamber, a delivery conduit extending from the separating chamber above and adjacent said screen to one of said first-mentioned chambers of the system, a screen of finer mesh than the first-mentioned screen within the separating chamber at a lower level than the first-mentioned screen and disposed to receive thereon the finely divided material passed through the latter, an outlet in the separating chamber above and adjacent the lower one of said screens, and an outlet in the separating chamber below the lower screen.

10. In a contacting process wherein a granular contact material is passed between a contacting zone and a zone for treating such material, the steps in the transportation of the contact material between said zones, comprising continuously passing the contact material in a fixed course between said zones, continuously adding a more finely divided solid material to the contact material in said course, continuously mixing said added material with the contact material while in transit along said course, screening in said course, the mixture of said materials before delivery of the contact material to the destined zone to separate more finely divided material from the contact material, passing the separated contact material to said destined zone, screening the separated finely divided material to separate undesirable fines therefrom and re-employing the said finely divided material separated from said fines in admixture with contact material in transit between said zones.

HYMAN R. DAVIS.

REFERENCES CITED

The following references are of record in the file of this patent:

UNITED STATES PATENTS

| Number | Name | Date |
| --- | --- | --- |
| 1,624,385 | Bergen | April 12, 1927 |
| 1,795,987 | Adams | Mar. 10, 1931 |
| 1,795,989 | Adams | Mar. 10, 1931 |
| 1,564,980 | Singer | Dec. 8, 1925 |
| 1,080,602 | Stokes | Dec. 9, 1913 |
| 2,321,015 | Davis | June 8, 1943 |
| 2,268,535 | Schutte | Dec. 30, 1941 |
| 2,357,255 | Dunham | Aug. 29, 1944 |

Certificate of Correction

Patent No. 2,429,402.  October 21, 1947.

HYMAN R. DAVIS

It is hereby certified that errors appear in the printed specification of the above numbered patent requiring correction as follows: Column 10, line 53, claim 9, after the word and comma "material," insert *in communication with one of the first-mentioned chambers of the system,*; line 65, same claim, for "one" read *the other*; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.*